Figure 1:
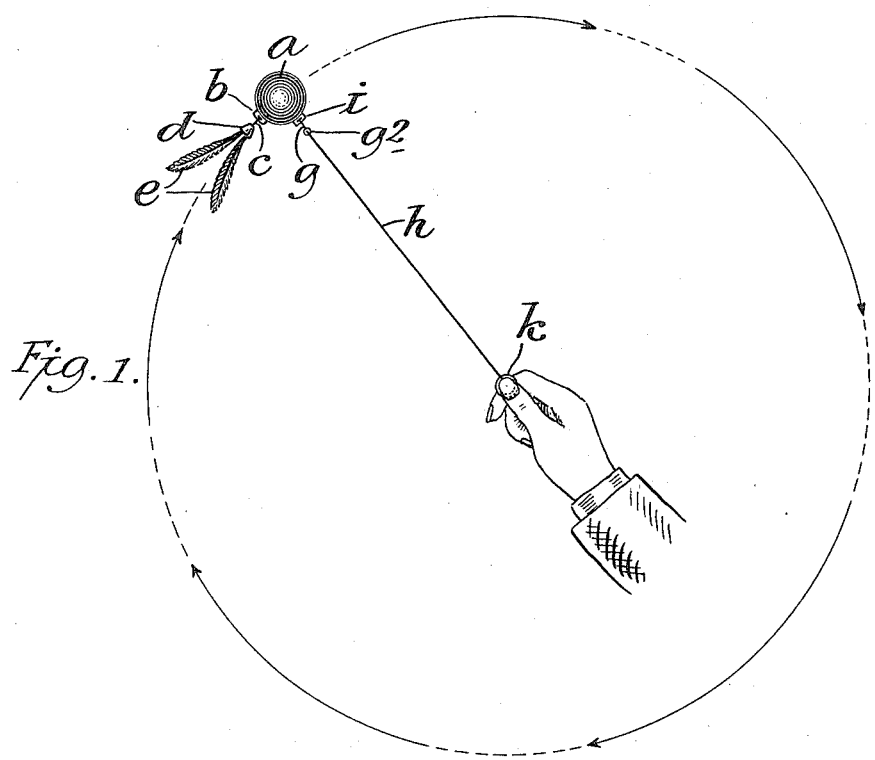

J. HILL.
TOY.
APPLICATION FILED NOV. 11, 1911.

1,032,604.

Patented July 16, 1912.

WITNESSES
A. R. Appleman
Frank J. Atlee

INVENTOR
Joseph Hill,
BY
Edgar Tate & Co.
ATTORNEYS

UNITED STATES PATENT OFFICE.

JOSEPH HILL, OF JERSEY CITY, NEW JERSEY.

TOY.

1,032,604.   Specification of Letters Patent.   Patented July 16, 1912.

Application filed November 11, 1911. Serial No. 659,693.

*To all whom it may concern:*

Be it known that I, JOSEPH HILL, a citizen of the United States, and residing at Jersey City, in the county of Hudson and State of New Jersey, have invented certain new and useful Improvements in Toys, of which the following is a specification, such as will enable those skilled in the art to which it appertains to make and use the same.

This invention relates to toys, and the object thereof is to provide an improved device of this class which is designed to amuse both young and old and which is also simple in construction, convenient of manipulation, and which, when manipulated as described, produces a humming musical sound which may be increased or decreased in volume.

The invention is fully disclosed in the following specification, of which the accompanying drawing forms part, in which the separate parts of my improvement are designated by suitable reference characters in each of the views, and in which:—

Figures 2, 3:
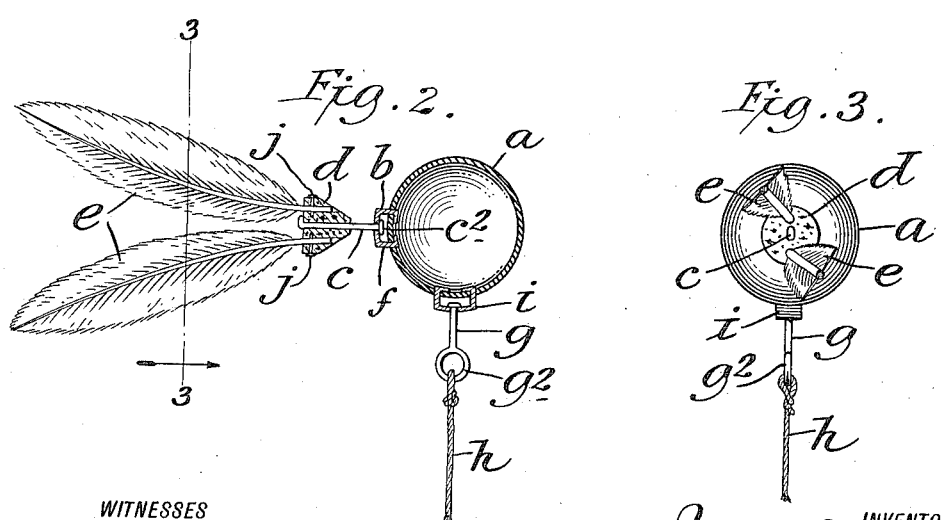

Figure 1 is a view showing my improved toy device and the method of its operation; Fig. 2 a sectional view showing the construction of the device, and; Fig. 3 a section on the line 3—3 of Fig. 2.

In the practice of my invention I provide a ball $a$ which may be composed of rubber, wood or any other suitable material, preferably fibrous material, and which is also preferably made hollow and of elastic material.

Connected with one side of the ball $a$ as shown at $b$ is a short pin or rod $c$ having a head $d$ preferably of fibrous material and in which is secured two feathers $e$, and the connection of the rod or pin $c$ with the ball is a swiveled connection and is preferably made by means of a metal link or clip $f$, and the rod or pin $c$ is provided with a head $c^2$ and is passed outwardly through the link or clip $f$ before said link or clip is secured to the ball, and this makes a swiveled connection for said rod or pin, whereby said rod or pin is free to rotate in said link or clip. I also connect with the ball $a$ at right angles to the rod or pin $c$, another rod or pin $g$ having an eye $g^2$, to which is secured a cord $h$. The connection of the rod or pin $g$ with the ball $a$ is also a swiveled connection and is made by means of a link or clip $i$ similar to the link or clip $b$.

The feathers $e$ are connected with the head $d$ of the rod or pin $c$ by inserting the stems or quills of said feathers into said head and securing the same by tacks or similar devices $j$, or this connection may be made in any desired manner, and in practice, the said feathers are also set at an angle to each other as shown in Fig. 3, and the cord $h$ is provided with a ring or other handle device $k$, and by grasping said ring or handle device as shown in Fig. 1, and swinging the ball $a$ through a circle, a humming musical sound will be produced, and this sound will increase or decrease in volume according to the speed at which the ball is whirled through or in the circle.

My invention is not limited to any exact means for connecting the cord $h$ and the feathers $e$ with the ball $a$ all that is necessary being that these connections be swiveled connections, and various changes in and modifications of the construction herein described may be made, within the scope of the appended claims, without departing from the spirit of my invention or sacrificing its advantages, and instead of the cord $h$ as a handle device for whirling the ball, a stick may be employed if desired, in which event the connection between the ball and the stick would be a swiveled coupling.

Having fully described my invention, what I claim as new and desire to secure by Letters Patent, is:—

1. A device of the class described, comprising a ball, a cord having a swiveled connection with said ball, and a plurality of feathers also having a swiveled connection with said ball.

2. A device of the class described, comprising a ball, a cord having a swiveled connection with said ball, and a plurality of feathers also having a swiveled connection with said ball at right angles to the connection of said cord, substantially as described.

3. A device of the class described, comprising a ball, a handle device connected with said ball by a swiveled coupling, and feathers rotatably connected with said ball at an angle to the handle device.

In testimony that I claim the foregoing as my invention I have signed my name in presence of the subscribing witnesses this 9th day of November 1911.

JOSEPH HILL.

Witnesses:
C. E. MULREANY,
FRANK G. AT LEE.